(12) United States Patent
Xu et al.

(10) Patent No.: US 9,369,076 B2
(45) Date of Patent: Jun. 14, 2016

(54) DYNAMIC BRAKING SYSTEM FOR AN ELECTRIC POWER SYSTEM AND METHOD OF OPERATING THE SAME

(75) Inventors: Yong Xu, Shanghai (CN); Robert Gregory Wagoner, Roanoke, VA (US); Jun Zhu, Shanghai (CN); Weng Li, Shanghai (CN); Jincheng Huang, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/412,389

(22) PCT Filed: Jul. 12, 2012

(86) PCT No.: PCT/CN2012/078543
§ 371 (c)(1),
(2), (4) Date: Dec. 31, 2014

(87) PCT Pub. No.: WO2014/008647
PCT Pub. Date: Jan. 16, 2014

(65) Prior Publication Data
US 2015/0188468 A1    Jul. 2, 2015

(51) Int. Cl.
*H02K 5/00*    (2006.01)
*H02P 9/02*    (2006.01)
(Continued)

(52) U.S. Cl.
CPC ............... *H02P 9/02* (2013.01); *F03D 7/0244* (2013.01); *H02P 9/007* (2013.01); *H02P 9/102* (2013.01); *F05B 2260/903* (2013.01); *H02P 2101/15* (2015.01); *Y02E 10/723* (2013.01)

(58) Field of Classification Search
USPC .......................................... 322/1; 290/44, 55
See application file for complete search history.

(56) References Cited

U.S. PATENT DOCUMENTS 3,657,625 A * 4/1972 Miller ....................... B60L 7/22
                                                                318/370
3,774,095 A * 11/1973 Coccia ....................... H02P 3/26
                                                                318/371

(Continued)

FOREIGN PATENT DOCUMENTS

CN    101860043 A    10/2010
CN    102055208 A    5/2011

OTHER PUBLICATIONS

An International Search Report and Written Opinion, dated Apr. 18, 2013, for PCT/CN2012/078543 (9 pgs).

*Primary Examiner* — Pedro J Cuevas
(74) *Attorney, Agent, or Firm* — James McGinness, Esq.; Armstrong Teasdale LLP (57) ABSTRACT

A dynamic braking system for an electric power system includes a switching device coupled to an electrical conductor. The switching device is configured to open and close with a plurality of predetermined frequencies. The dynamic braking system also includes an inductive device coupled to the switching device. The power losses of the inductive device are at least partially a function of the plurality of predetermined frequencies. The dynamic braking system further includes a dynamic braking controller coupled to the switching device. The dynamic braking controller is configured to open and close the switching device with at least one of the predetermined frequencies to dissipate electric power from the electrical conductor at a predetermined rate by regulating the power losses of the inductive device as a function of the predetermined frequencies.

20 Claims, 5 Drawing Sheets

(51) Int. Cl.
*H02P 9/00* (2006.01)
*H02P 9/10* (2006.01)
*F03D 7/02* (2006.01)
*F03D 9/00* (2006.01)
*H02P 9/04* (2006.01)
*H02P 101/15* (2015.01)

(56) References Cited

U.S. PATENT DOCUMENTS

| | | | | |
|---|---|---|---|---|
| 3,819,998 | A * | 6/1974 | Yole | B23Q 15/26 318/277 |
| 4,481,449 | A * | 11/1984 | Rodal | G11B 15/22 318/134 |
| 4,672,298 | A * | 6/1987 | Rohatyn | G05F 1/70 323/208 |
| 4,761,600 | A | 8/1988 | D'Atre et al. | |
| 4,767,970 | A * | 8/1988 | Rodal | G11B 15/22 318/261 |
| 5,198,745 | A | 3/1993 | Larsen et al. | |
| 5,998,880 | A * | 12/1999 | Kumar | B60L 11/08 290/40 A |
| 6,486,568 | B1 * | 11/2002 | King | B60L 11/02 307/66 |
| 6,486,639 | B1 | 11/2002 | Montret et al. | |
| 6,752,614 | B2 | 6/2004 | Mizuno | |
| 7,126,236 | B2 * | 10/2006 | Harbourt | F03D 7/0224 290/44 |
| 7,418,820 | B2 * | 9/2008 | Harvey | F03D 7/02 60/398 |
| 7,423,412 | B2 | 9/2008 | Weng et al. | |
| 7,466,109 | B1 | 12/2008 | Larsen et al. | |
| 7,554,278 | B2 * | 6/2009 | Wegner-Donnelly | B66C 13/18 187/277 |
| 7,573,732 | B2 * | 8/2009 | Teichmann | H02M 1/32 363/37 |
| 7,586,216 | B2 | 9/2009 | Li et al. | |
| 7,786,608 | B2 | 8/2010 | Menke | |
| 7,942,631 | B2 * | 5/2011 | Melius | F03D 7/0224 415/1 |
| 7,978,445 | B2 | 7/2011 | Ritter | |
| 8,013,461 | B2 * | 9/2011 | Delmerico | H02M 5/4585 290/44 |
| 8,080,891 | B2 * | 12/2011 | Schramm | F03D 7/0248 290/44 |
| 8,093,740 | B2 * | 1/2012 | Oohara | F03D 7/0224 290/44 |
| 8,093,741 | B2 | 1/2012 | Ritter et al. | |
| 8,203,229 | B2 * | 6/2012 | Stone | F03D 7/0248 290/4 R |
| 8,258,642 | B2 * | 9/2012 | Koerber | F03D 7/0284 290/44 |
| 8,344,550 | B2 * | 1/2013 | Delmerico | H02J 3/32 307/82 |
| 8,432,054 | B2 * | 4/2013 | Mackay | F03D 11/02 290/44 |
| 8,587,160 | B2 * | 11/2013 | Dai | H02J 3/386 307/151 |
| 8,664,788 | B1 * | 3/2014 | Wagoner | F03D 7/0244 290/44 |
| 8,907,510 | B2 * | 12/2014 | Wagoner | H02P 9/007 290/44 |
| 8,975,768 | B2 * | 3/2015 | Wagoner | H02P 3/22 290/44 |
| 8,981,584 | B2 * | 3/2015 | Banham-Hall | F03D 7/0224 290/44 |
| 9,041,234 | B2 * | 5/2015 | Lu | F03D 7/0224 290/44 |
| 9,115,694 | B2 * | 8/2015 | Brown | F03D 7/0224 |
| 2006/0192390 | A1 * | 8/2006 | Juanarena Saragueta | F03D 9/002 290/44 |
| 2006/0208493 | A1 * | 9/2006 | Harbourt | F03D 7/0224 290/44 |
| 2006/0210406 | A1 * | 9/2006 | Harvey | F03D 7/02 417/334 |
| 2007/0273155 | A1 * | 11/2007 | Barton | H02J 3/1892 290/44 |
| 2007/0278797 | A1 | 12/2007 | Flannery et al. | |
| 2007/0279815 | A1 * | 12/2007 | Li | F03D 7/0248 361/54 |
| 2008/0048497 | A1 * | 2/2008 | Donnelly | B66C 13/18 307/19 |
| 2008/0291708 | A1 * | 11/2008 | Teichmann | H02M 1/32 363/50 |
| 2008/0296898 | A1 | 12/2008 | Ichinose et al. | |
| 2009/0261589 | A1 * | 10/2009 | Oohara | F03D 7/0224 290/44 |
| 2009/0278351 | A1 | 11/2009 | Rivas et al. | |
| 2009/0278352 | A1 * | 11/2009 | Rivas | F03D 7/0224 290/44 |
| 2010/0133823 | A1 * | 6/2010 | Schramm | F03D 7/0248 290/44 |
| 2010/0135791 | A1 * | 6/2010 | Melius | F03D 7/0224 416/1 |
| 2010/0140939 | A1 * | 6/2010 | Scholte-Wassink | F03D 7/0224 290/44 |
| 2010/0308584 | A1 * | 12/2010 | Coates | H02J 3/32 290/44 |
| 2010/0314873 | A1 * | 12/2010 | Stone | F03D 7/0248 290/44 |
| 2010/0314881 | A1 * | 12/2010 | Stone | F03D 11/02 290/55 |
| 2011/0057443 | A1 * | 3/2011 | Rivas | F03D 7/0224 290/44 |
| 2011/0057444 | A1 * | 3/2011 | Dai | H02J 3/386 290/44 |
| 2011/0140430 | A1 * | 6/2011 | Ritter | H02J 3/386 290/44 |
| 2011/0140438 | A1 * | 6/2011 | Delmerico | H02M 5/4585 290/55 |
| 2011/0204637 | A1 * | 8/2011 | Ritter | H02J 3/32 290/44 |
| 2011/0222320 | A1 * | 9/2011 | Delmerico | H02J 3/32 363/37 |
| 2012/0139243 | A1 * | 6/2012 | Koerber | F03D 7/0284 290/44 |
| 2012/0313377 | A1 * | 12/2012 | Mackay | F03D 11/02 290/55 |
| 2013/0038061 | A1 * | 2/2013 | Rivas | F03D 7/0224 290/44 |
| 2013/0207394 | A1 * | 8/2013 | Banham-Hall | F03D 7/0224 290/44 |
| 2013/0234435 | A1 * | 9/2013 | Wagoner | H02P 9/007 290/44 |
| 2013/0249501 | A1 * | 9/2013 | Lu | F03D 7/0224 322/21 |
| 2013/0301177 | A1 * | 11/2013 | Wagoner | H02H 7/067 361/91.1 |
| 2013/0334818 | A1 * | 12/2013 | Mashal | F03D 7/0264 290/44 |
| 2014/0054892 | A1 * | 2/2014 | Brown | F03D 7/0224 290/44 |
| 2014/0070535 | A1 * | 3/2014 | Wagoner | F03D 7/0244 290/44 |
| 2014/0219802 | A1 * | 8/2014 | Lundhild | F03D 3/068 416/147 |
| 2014/0361538 | A1 * | 12/2014 | Wagoner | H02P 3/22 290/44 |
| 2014/0361540 | A1 * | 12/2014 | Knight | F03D 1/005 290/44 |
| 2015/0077067 | A1 * | 3/2015 | Kanjiya | H02H 7/067 322/21 |
| 2015/0188468 | A1 * | 7/2015 | Xu | H02P 9/007 290/44 |
| 2015/0229257 | A1 * | 8/2015 | Lu | F03D 7/0224 322/21 |

\* cited by examiner

DYNAMIC BRAKING SYSTEM FOR AN ELECTRIC POWER SYSTEM AND METHOD OF OPERATING THE SAME

CROSS REFERENCE TO RELATED APPLICATIONS

This application claims the benefit of PCT Patent Application No. PCT/CN2012/078543 filed Jul. 12, 2012, which is hereby incorporated by reference in its entirety.

BACKGROUND OF THE INVENTION

The subject matter described herein relates generally to controlling operation of electric power systems, and more specifically, to equipment and methods for dynamically braking power converters.

Generally, a wind turbine includes a rotor that includes a rotatable hub assembly having multiple blades. The blades transform wind energy into a mechanical rotational torque that drives one or more generators via the rotor. At least some of the known wind turbines are physically nested together in a common geographical region to form a wind turbine farm. Variable speed operation of the wind turbine facilitates enhanced capture of energy when compared to a constant speed operation of the wind turbine. However, variable speed operation of the wind turbine produces electric power having varying voltage and/or frequency. More specifically, the frequency of the electric power generated by the variable speed wind turbine is proportional to the speed of rotation of the rotor. A power converter may be coupled between the wind turbine's electric generator and an electric utility grid. The power converter receives the electric power from the wind turbine generator and transmits electricity having a fixed voltage and frequency for further transmission to the utility grid via a transformer. The transformer may be coupled to a plurality of power converters associated with the wind turbine farm.

The wind turbine may not be able to operate through certain grid events occurring downstream of the transformer, since wind turbine control devices require a finite period of time to sense the event, and then make adjustments to wind turbine operation to take effect after detecting such grid event. Therefore, in the interim period, the wind turbine may sustain wear and/or damage due to certain grid events. Such grid events include electrical faults that, under certain circumstances, may induce grid voltage fluctuations that may include low voltage transients with voltage fluctuations that approach zero volts. At least some known protective devices and systems facilitate continued operation during certain grid events. For example, for grid transients such as short circuits, a low, or zero voltage condition on the grid may occur. Under such conditions, such known protective devices and systems define a low and/or a zero voltage ride through (LVRT and ZVRT, respectively) capability. Such LVRT/ZVRT capabilities facilitate operation of the power converters of individual wind turbines and wind turbine farms to transmit reactive power into the utility grid. Such injection of reactive power into the grid facilitates stabilizing the grid voltage while grid isolation devices external to the wind farm, such as automated reclosers, will open and reclose to clear the fault while the LVRT/ZVRT features of the wind turbines maintain the generators coupled to the utility grid. In addition, natural transients, e.g., wind gusts may also induce a spike in energy generation.

Under such transient conditions, the power converter dissipates at least some of the stored energy therein as well as the energy still being generated by the generator that has not been removed from service. Some known dissipative circuits, i.e., dynamic breaking circuits, associated with power converters include at least one fast switching device, e.g., an insulated gate bipolar transistor (IGBT), a gate turn-off thyristor (GTO), or a silicon-controlled rectifier (SCR), in series with a resistive device. In the event of a voltage surge on the DC buses of the power converter due to increased stored energy, the switching devices of the dissipative circuit will open and close to transmit DC current to the resistive device, wherein the electric current is dissipated as heat energy. These extra components increase the size, weight, and cost of power converters.

BRIEF DESCRIPTION OF THE INVENTION

In one aspect, a dynamic braking system for an electric power system is provided. The dynamic braking system includes a switching device coupled to an electrical conductor. The switching device is configured to open and close with a plurality of predetermined frequencies. The dynamic braking system also includes an inductive device coupled to the switching device. The power losses of the inductive device are at least partially a function of the plurality of predetermined frequencies. The dynamic braking system further includes a dynamic braking controller coupled to the switching device. The dynamic braking controller is configured to open and close the switching device with at least one of the predetermined frequencies to dissipate electric power from the electrical conductor at a predetermined rate by regulating the power losses of the inductive device as a function of the predetermined frequencies.

In another aspect, an electric power system is provided. The electric power system includes a direct current (DC) bus and a dynamic braking system coupled to the DC bus. The dynamic braking system includes an alternating current (AC) bus having power losses that are at least partially a function of a frequency of electric power transmitted therethrough. The dynamic braking system also includes a switching device coupled to each of the DC bus and the inductive device. The switching device is configured to open and close with a plurality of predetermined frequencies. The dynamic braking system further includes a dynamic braking controller coupled to the switching device. The dynamic braking controller is configured to open and close the switching device with at least one of the predetermined frequencies to dissipate electric power from the DC bus at a predetermined rate by regulating the power losses of the AC bus as a function of the predetermined frequencies.

In yet another aspect, a method for controlling an electric power system during electrical fault conditions is provided. The electric power system includes an electric power generating device and an electric power converter coupled to the electric power generating device. The electric power converter includes at least one switching device. The electric power converter is coupled to an electric power grid through an inductive device. The electric power system also includes a virtual dynamic braking system including a virtual dynamic braking controller. The method includes operating the switching device at a first frequency and monitoring at least one electrical condition of the electric power system. The method also includes operating the switching device at a second frequency that is different from the first frequency as a function of a value of the monitored electrical condition, thereby regulating power losses of the inductive device and dissipating electric power through the switching device and the inductive device at a predetermined rate.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

As used herein, the terms "disturbance," "grid disturbance," "fault," "system fault," "transient" and other similar terms generally refer to any event that causes perturbations in the input signal from the electric/power grid. For example, such disturbances can include impulses, notches, glitches, momentary interruptions, voltage sag/swells, harmonic distortions, and flickers. Generally, the grid signal is a three-phase signal that includes sequence components having particular frequencies. The three-phase signal includes positive sequence components, negative sequence components, and zero or neutral sequence components. Each of the components includes frequency information, phase information, and magnitude information. As a variety of generating facilities contribute to the grid signal, and as a variety of phenomena including transient events occur, the sequence components may develop harmonic frequencies or phase shifts, either one that can create disturbances which can complicate efficient operation of control systems and/or decrease other aspects of grid performance.

Technical effects of the methods, apparatus, and systems described herein include at least one of: (a) providing a virtual dynamic brake and using existing components to dissipate electric power from an electric power system; (b) dissipating electric power from an electric power system by increasing losses through line side inductors and line side semi-conductor switching devices by regulating the frequency of the electric power transmitted through the inductors and devices, wherein the electric power losses increase as the switching frequency increases; and (c) providing a virtual dynamic brake that cooperates with at least one of a traditional AC crowbar, a virtual AC crowbar, and a DC dynamic brake to enhance an LVRT/ZVRT and wind gust performance of a wind power converter when an associated electric power system is recovering from an LVRT/ZVRT/wind gust event.

The methods, apparatus, and systems described herein facilitate providing an operational functionality typically associated with a dynamic brake for an electric power system by using existing equipment and without adding extra components ordinarily associated with dynamic braking. Specifically, the methods, apparatus, and systems described herein facilitate dissipating electric power accumulated in a DC link of a power converter by using the features and capabilities of the power converter and a line side inductor. More specifically, the methods, apparatus, and systems described herein facilitate dissipating electric power accumulated in a DC link of a power converter by increasing losses through line side inductors and line side semi-conductor switching devices by regulating the frequency of the electric power transmitted through the inductors and devices, wherein the electric power losses increase as the switching frequency increases. Also, specifically, the methods, apparatus, and systems described herein facilitate dissipating electric power accumulated in a DC link of a power converter by operating independently. Further, specifically, the methods, apparatus, and systems described herein facilitate dissipating electric power accumulated in a DC link of a power converter by cooperating with at least one of a traditional AC crowbar, a virtual AC crowbar, and a DC dynamic brake to enhance an LVRT/ZVRT/wind gust performance of a wind power converter when an associated electric power system is recovering from an LVRT/ZVRT/wind gust event. Therefore, the methods, apparatus, and systems described herein facilitate eliminating a need for additional hardware and further facilitate decreasing the size of the components in other electric power dissipation devices, thereby decreasing construction costs and operational and maintenance costs.

Although generally described herein with respect to a wind turbine facility, the systems described herein are applicable to any type of electric generation system including, for example, solar power generation systems, fuel cells, geothermal generators, hydropower generators, and/or other devices that generate power from renewable and/or non-renewable energy sources.

Figure 1:
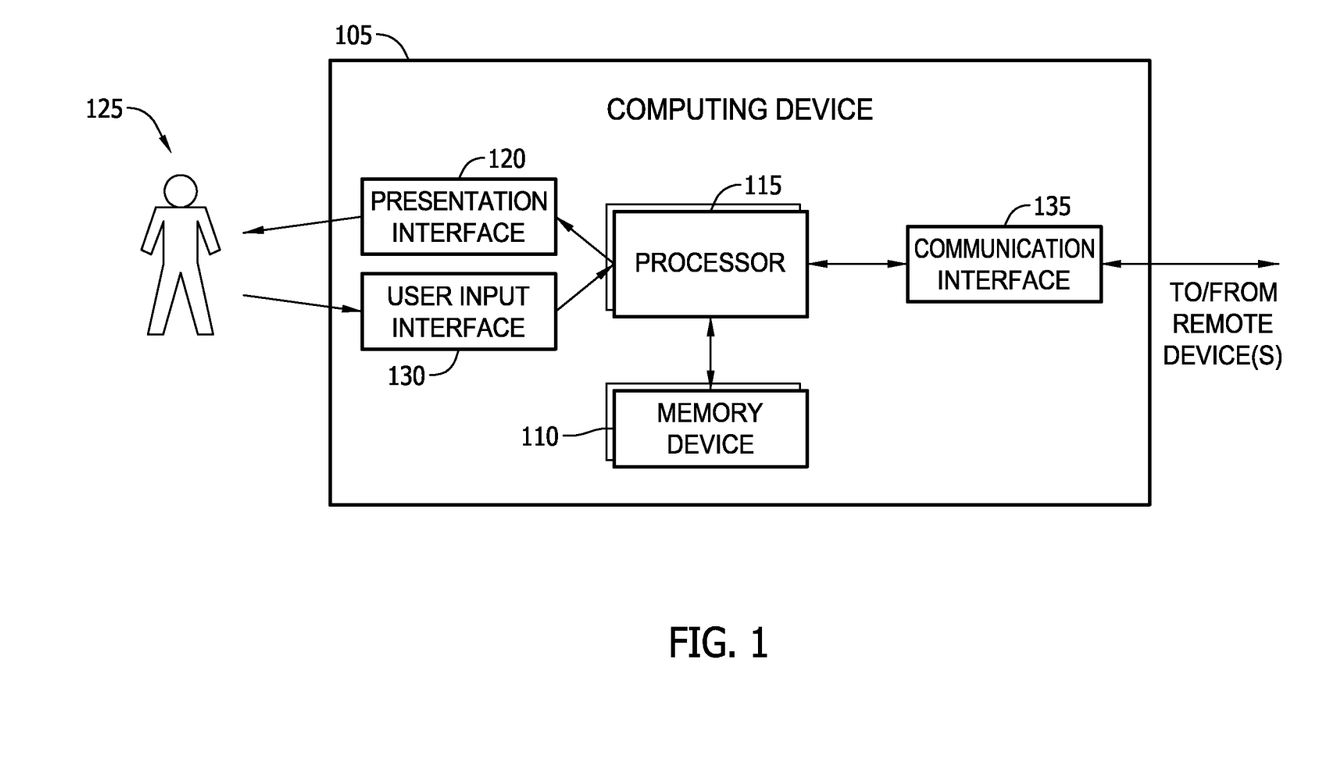
FIG. 1 is a block diagram of an exemplary computing device that may be used to monitor and/or control the operation of a portion of an electric power system.

FIG. 1 is a block diagram of an exemplary computing device 105 that may be used to monitor and/or control the operation of a portion of an electric power system (not shown in FIG. 1). Computing device 105 includes a memory device 110 and a processor 115 operatively coupled to memory device 110 for executing instructions. As used herein, the term "processor" includes any suitable programmable circuit such as, without limitation, one or more systems and microcontrollers, microprocessors, a general purpose central processing unit (CPU), reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

Processor 115 may include one or more processing units (e.g., in a multi-core configuration). In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In addition, in the exemplary embodiment, memory device 110 is at least one device coupled to processor 115 that enables storage and retrieval of information such as computer-executable instructions and data, including, without limitation, operating data, parameters, setpoints, threshold values, and/or any other data that enables computing device 105 to function as described herein. Memory device 110 may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Further, as used herein, the terms "software" and "firmware" are interchangeable, and include any computer program stored in memory for execution by personal computers, workstations, clients and servers.

Memory device 110 may be configured to store operational measurements including, without limitation, utility electric power grid voltage and current readings (not shown in FIG. 1), substation voltage and current readings (not shown in FIG. 1), localized voltage and current readings throughout an electric power generation system (not shown in FIG. 1), and/or any other type of data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate centralized and distributed control of electric power system protection and control systems (discussed further below).

In some embodiments, computing device 105 includes a presentation interface 120 coupled to processor 115. Presentation interface 120 presents information, such as a user interface and/or an alarm, to a user 125. In one embodiment, presentation interface 120 includes a display adapter (not shown) that is coupled to a display device (not shown), such as a cathode ray tube (CRT), a liquid crystal display (LCD), an organic LED (OLED) display, and/or an "electronic ink" display. In some embodiments, presentation interface 120 includes one or more display devices. In addition, or alternatively, presentation interface 120 includes an audio output device (not shown) (e.g., an audio adapter and/or a speaker) and/or a printer (not shown). In some embodiments, presentation interface 120 presents an alarm associated with a synchronous machine (not shown in FIG. 1), such as by using a human machine interface (HMI) (not shown).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
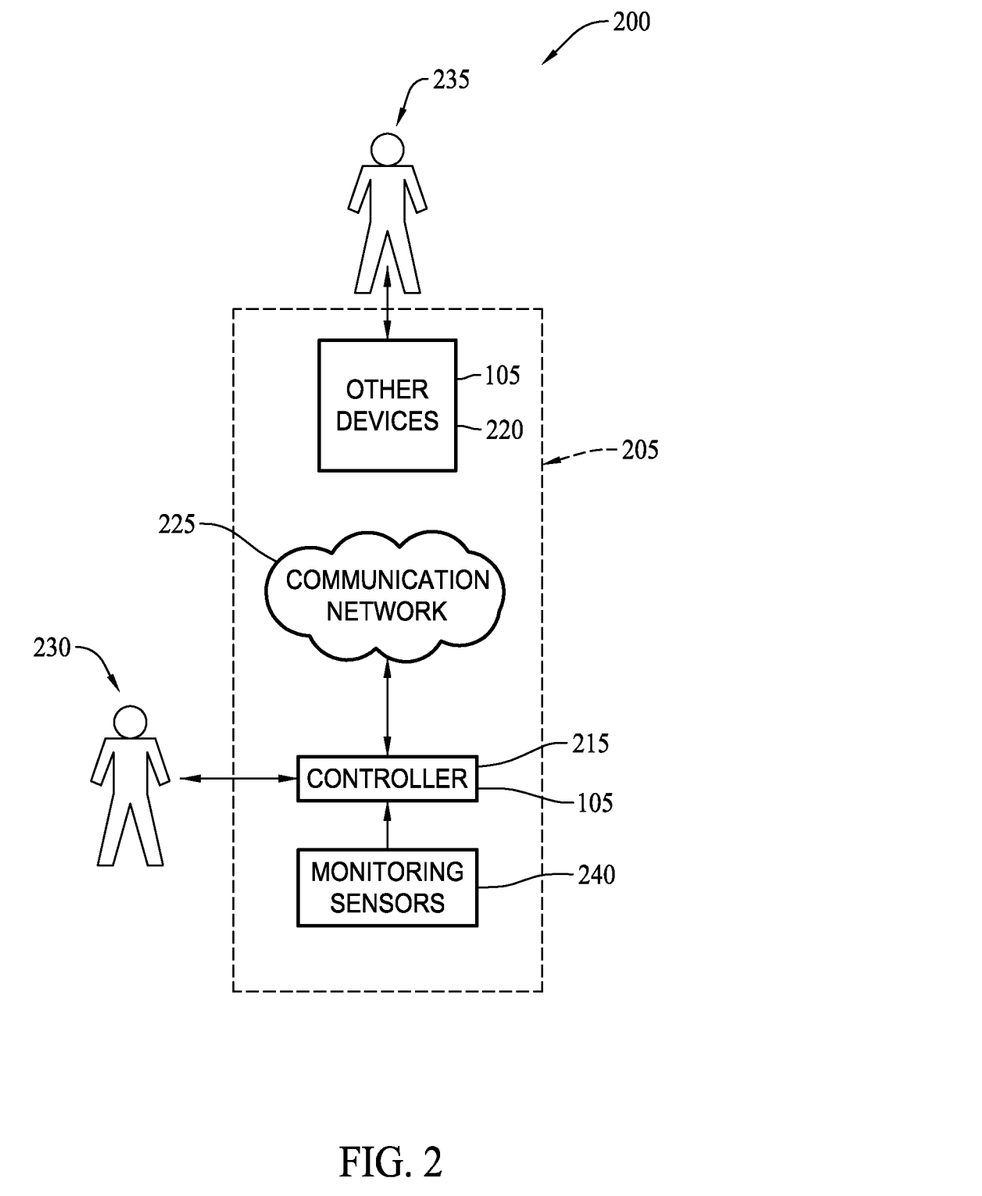
FIG. 2 is block diagram of a portion of an exemplary electric power system protection and control system.

FIG. 2 is block diagram of a portion of an exemplary electric power system protection and control system 200 that may be used to monitor and/or operate at least a portion of an electric power system 205. Electric power system protection and control system 200 includes an electric power system protection and control system controller 215 that may be coupled to other devices 220 via a communication network 225. Protection and control system controller 215 may be, without limitation, a substation-level centralized controller, a wind turbine-level centralized controller, and one of a plurality of distributed controllers. Embodiments of network 225 may include operative coupling with, without limitation, the Internet, a local area network (LAN), a wide area network (WAN), a wireless LAN (WLAN), and/or a virtual private network (VPN). While certain operations are described below with respect to particular computing devices 105, it is contemplated that any computing device 105 may perform one or more of the described operations. For example, controller 215 may perform all of the operations below.

Referring to FIGS. 1 and 2, controller 215 is a computing device 105. In the exemplary embodiment, computing device 105 is coupled to network 225 via communication interface 135. In an alternative embodiment, controller 215 is integrated with other devices 220. As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits (none shown in FIG. 2), and these terms are used interchangeably herein.

Controller 215 interacts with a first operator 230 (e.g., via user input interface 130 and/or presentation interface 120). In one embodiment, controller 215 presents information about electric power system 205, such as alarms, to operator 230. Other devices 220 interact with a second operator 235 (e.g., via user input interface 130 and/or presentation interface 120). For example, other devices 220 present alarms and/or other operational information to second operator 235. As used herein, the term "operator" includes any person in any capacity associated with operating and maintaining electric power system 205, including, without limitation, shift operations personnel, maintenance technicians, and system supervisors.

In the exemplary embodiment, protection and control system 200 includes one or more monitoring sensors 240. Monitoring sensors 240 collect operational measurements including, without limitation, voltage and current readings throughout electric power system 205, including, without limitation, substation and wind turbine generator readings, and/or any other type of data. Monitoring sensors 240 repeatedly (e.g., periodically, continuously, and/or upon request) transmit operational measurement readings at the time of measurement. Controller 215 receives and processes the operational measurement readings. Also, controller 215 includes, without limitation, sufficient data, algorithms, and commands to facilitate centralized and/or distributed protection and control of electric power system 205 (discussed further below).

Also, in the exemplary embodiment, electric power system 205 includes additional monitoring sensors (not shown) similar to monitoring sensors 240 that collect operational data measurements associated with the remainder of electric power system 205 including, without limitation, data from additional devices similar to controller 215 and environmental data, including, without limitation, local outside temperatures. Such data is transmitted across network 225 and may be accessed by any device capable of accessing network 225 including, without limitation, desktop computers, laptop computers, and personal digital assistants (PDAs) (neither shown).

The methods described herein may be encoded as executable instructions and algorithms embodied in a tangible, non-transitory, computer readable medium, including, without limitation, a storage device and/or a memory device. Such instructions and algorithms, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital source such as a network or the Internet, as well as yet to be developed digital means, with the sole exception being a transitory, propagating signal.

Figure 3:
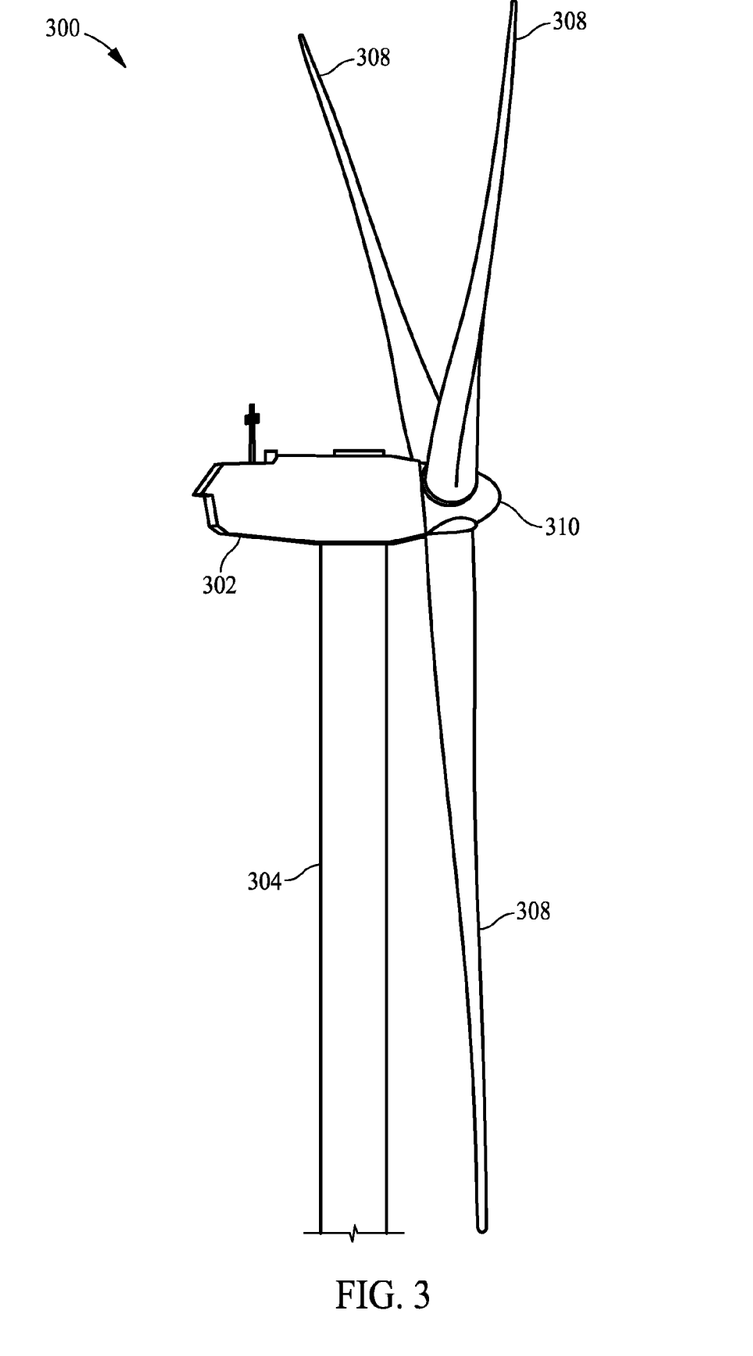
FIG. 3 is a schematic view of an exemplary wind turbine.

FIG. 3 is a schematic view of an exemplary wind turbine generator 300. Wind turbine generator 300 is an electric power generation device including a nacelle 302 housing a generator (not shown in FIG. 3). Nacelle 302 is mounted on a tower 304 (a portion of tower 304 being shown in FIG. 3). Tower 304 may be any height that facilitates operation of wind turbine generator 300 as described herein. Wind turbine generator 300 also includes a rotor 306 that includes three rotor blades 308 attached to a rotating hub 310. Alternatively, wind turbine generator 300 includes any number of blades 308 that facilitates operation of wind turbine generator 300 as described herein. In the exemplary embodiment, wind turbine generator 300 includes a gearbox (not shown in FIG. 3) rotatably coupled to rotor 306 and the generator.

Figure 4:
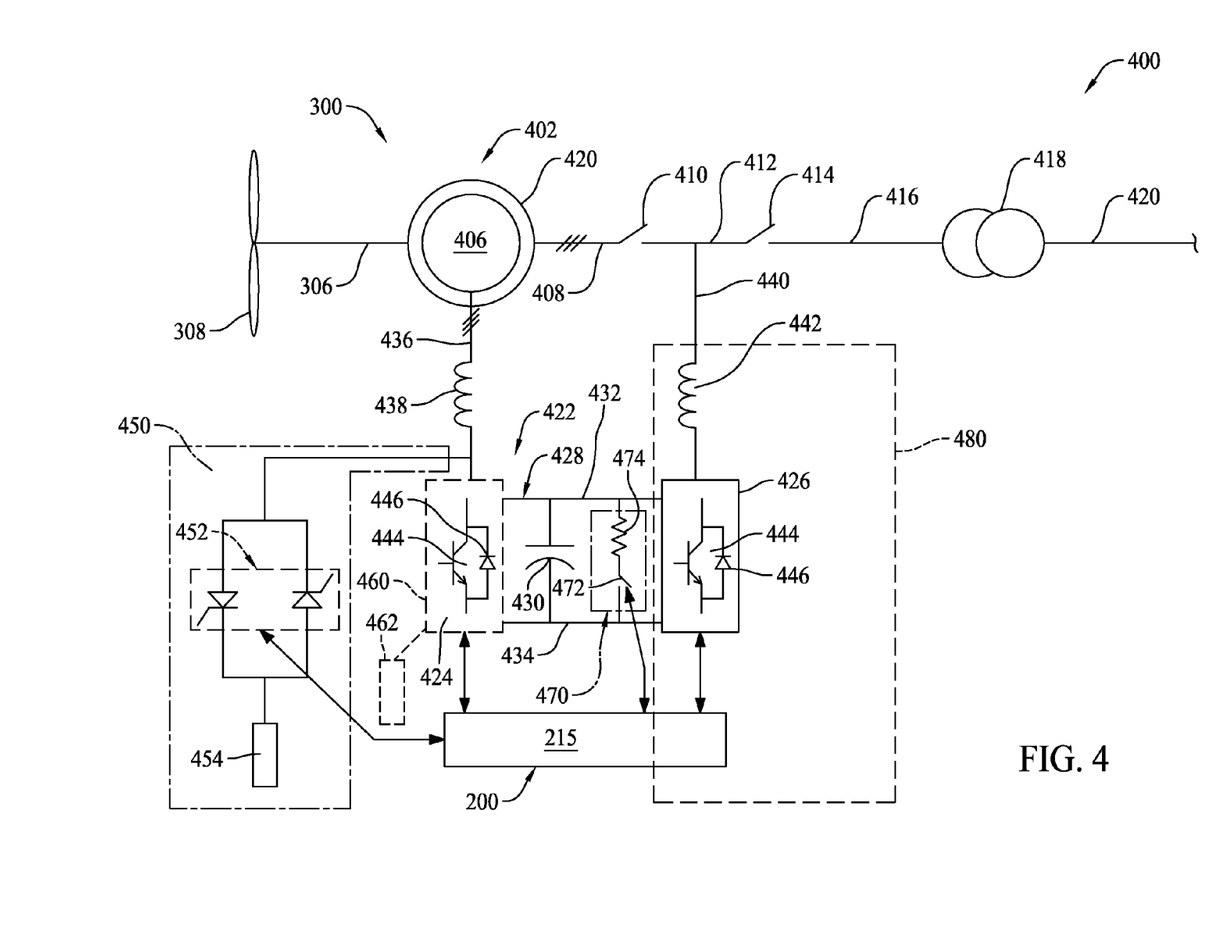
FIG. 4 is a schematic view of an exemplary electric power system for a doubly fed induction generator (DFIG) that may be used with the wind turbine shown in FIG. 3.

FIG. 4 is a schematic view of an exemplary electric power system 400 for a doubly fed induction generator (DFIG) 402 that may be used with wind turbine 300. Electric power system 400 is a three-phase system and only one phase is shown for clarity. In the exemplary embodiment, DFIG 402 includes a generator stator 404 extending about a generator rotor 406. Stator 404 is coupled to a stator bus 408. A stator-synchronizing switch 410 couples stator bus 408 to a line bus 412 when switch 410 is closed. A grid circuit breaker 414 couples line bus 412 to a main transformer bus 416 when breaker 414 is closed. Main transformer bus 416 is coupled to a main transformer 418 that couples electric power system 400 to an electric power grid 420. Stator 404 generates, and stator bus 408 transmits, three-phase electric power.

Also, in the exemplary embodiment, electric power system 400 includes an electric power converter 422. Electric power converter 422 includes a generator side portion 424 coupled to a line side portion 426 through a direct current (DC) link 428. DC link 428 includes at least one capacitive device 430 coupled to a positive DC bus 432 and a negative DC bus 434. Generator side portion 424 is coupled to generator rotor 406 through an AC rotor bus 436 that includes at least one inductive device 438. Similarly, line side portion 426 is coupled to line bus 412 through an AC line bus 440 that includes at least one inductive device 442. AC rotor bus 436 transmits three-phase electric power to and from generator rotor 406 and AC line bus 440 transmits three-phase electric power to and from line bus 412.

Each of generator side portion 424 and line side portion 426 of electric power converter 422 includes a plurality of semiconductor switching devices 444 (only one switching device 444 shown in each portion 424 and 426) coupled together in serial arrangement for each phase of electrical power that electric power converter 422 receives, converts, and transmits. In the exemplary embodiment, switching devices 444 are semiconductor devices, e.g., insulated gate bipolar transistors (IGBTs), that include base, emitter, and collector portions (not shown) and an inverse, or anti-parallel diode 446. Alternatively, switching devices 444 are any other suitable transistor or any other suitable switching device, including, without limitation, gate turn-off thyristors (GTOs). Alternatively, generator side portion 424 and line side portion 426 may include any suitable number of switching devices 444 arranged in any suitable configuration.

Further, in the exemplary embodiment, electric power system 400 includes a plurality of protective devices and systems. A crowbar circuit 450 is coupled to AC rotor bus 436. Crowbar circuit 450 includes a plurality of switching devices 452 coupled in series with a resistor bank 454. Switching devices 452 are any switching devices that enable operation of crowbar circuit 450 as described herein, including, without limitation, GTOs and IGBTs. In operation, crowbar circuit 450 shorts AC rotor bus 436 to resistor bank 454 to rapidly de-energize generator side portion 424 of electric power converter 422.

Also, electric power system 400 includes a virtual crowbar system 460 coupled to positive DC bus 432 and negative DC bus 434. Virtual crowbar system 460 includes generator side portion 424 coupled in series with a resistor bank 452 through an isolation device, e.g., a circuit breaker (not shown). In operation, virtual crowbar system 460 shorts AC rotor bus 436 to resistor bank 462 to rapidly de-energize generator side portion 424 of electric power converter 422.

Further, electric power system 400 includes a DC dynamic brake 470 coupled to positive DC bus 432 and negative DC bus 434. DC dynamic brake 470 includes at least one switching device 472 coupled in series with at least one resistor 474. Switching device 472 is any switching device that enables operation of DC dynamic brake 470 as described herein, including, without limitation, GTOs and IGBTs. In operation, switching device 472 couples DC bus 432 and negative DC bus 434 to resistor 474 to rapidly de-energize generator side portion 424 and line side portion 426 of electric power converter 422. Alternatively, electric power system 400 includes any combination of crowbar circuit 450, virtual crowbar system 460, and DC dynamic brake 470 that enables operation of system 400 as described herein.

Moreover, in the exemplary embodiment, electric power system 400 includes electric power system protection and control system controller 215. Controller 215 is coupled to, and controls the operation of, semiconductor switching devices 444 in generator side portion 424 and line side portion 426, switching devices 452, and switching device 472. Therefore, controller 215 controls the operation of generator side portion 424, line side portion 426, crowbar circuit 450, virtual crowbar system 460, and DC dynamic brake 470.

Also, in the exemplary embodiment, electric power system 400 includes a virtual dynamic braking system 480. Virtual dynamic braking system 480 includes line side portion 426 of electric power converter 422, inductive device 442, and controller 215. Therefore, controller 215 controls the operation of line side portion 426 through controlling switching devices 444 therein. In the exemplary embodiment, controller 215 is a centralized controller for the entirety of electric power system protection and control system 200, including, without limitation, virtual dynamic braking system 480. Alternatively, controller 215 is a portion of a distributed control scheme, wherein, in some embodiments, controller 215 is a standalone virtual dynamic braking controller. Furthermore, virtual dynamic braking system 480 includes at least one monitoring sensor 240 (shown in FIG. 2) coupled to inductive device 442 and controller 215, wherein monitoring sensor 240 measures voltages and currents associated with inductive device 442. Moreover, virtual dynamic braking system 480 includes at least one monitoring sensor 240 coupled to an electrical conductor, i.e., DC link 428, and controller 215, wherein monitoring sensor 240 measures voltages and currents on DC link 428:

Electric power dissipation through switching devices 444 and diodes 446 of line side portion 426 is facilitated by, and is proportional to, switching losses of such devices 444 and diodes 446. The switching losses are a function of a switching frequency of devices 444, i.e., as the switching frequency increases, the switching losses increase. Therefore, electric power dissipation by converting stored electric energy to heat energy is performed through switching devices 444 and diodes 446. An upper limit of the switching frequency is at least partially determined based on the temperature ratings of devices 444 and diodes 446.

Electric power dissipation through line side inductive devices 442 and AC line buses 440 (only one of each shown in FIG. 4) is represented by the algorithm:

$$P_{Total\ Inductance} = P_{Core} + P_{DCR} + P_{ACR} + P_{Fringing} \quad (Eq.\ 1)$$

wherein, $P_{Total\ Inductance}$ represents the total power loss due to the total inductance of all inductive devices 442 and the inductive properties of AC line bus 440. $P_{Core}$ represents the core power losses of AC line bus 440 and inductive devices 442 that are a function of variables that include, without limitation, the frequency and the peak voltage of the electricity transmitted therethrough. $P_{Core}$ is also a function of steady-state features that include, without limitation, the physical dimensions of inductive devices 442, the material used to fabricate inductive devices 442, and the number of turns in inductive devices 442.

$P_{DCR}$ represents the power losses due to DC resistances of line bus 440 and inductive devices 442.

$P_{ACR}$ represents the power losses due to AC resistances of line bus 440 and inductive devices 442. Such AC resistances are at least partially based on the "skin effect" and the "proximity effect" associated with AC conductors. The skin effect is defined as the tendency of an AC current to distribute itself within a conductor with the current density being greatest near the surface of the conductor and decreasing as the depth increases. As the AC current is shifted to the outer portions of the conductor, the apparent resistance of the conductor increases. The proximity effect is defined as the tendency for nearby conductors to affect the current density within each of the conductors as a function of the strength of the electromagnetic fields induced by each. For example, for adjacent conductors transmitting current in the same direction, the currents will be shifted away from the adjacent conductor. Such shifting typically results in crowding of the current in portions of the conductors that increases the apparent AC resistance of the conductor. Both the skin effect and the proximity effect are a function of frequency of the electricity transmitted through the conductor. Therefore, as the frequency increases, the equivalent resistance of the conductor increases, and the $I^2R$ losses associated with the conductor will increase.

$P_{Fringing}$ represents the power losses due to magnetic reluctances in air gaps (not shown) between turns (not shown) in inductive devices 442. Such air gap reluctances induce a bulging, or fringing magnetic field that includes a leakage flux in each air gap that induces an increased resistance to current transmission therethrough. The magnitude of such leakage flux is at least partially dependent on the frequency of the current transmitted through inductive devices 442. Therefore, increasing the frequency of the current through inductive devices 442 increases the leakage flux and the fringing field power losses.

In operation, sinusoidal three-phase AC electric power generated by stator 404 of DFIG 402 is transmitted to electric power grid 420 through stator bus 408, stator synchronizing switch 410, line bus 412, grid circuit breaker 414, main transformer bus 416, and main transformer 418.

Also, in operation, the relative speeds between generator rotor 406 and generator stator 404 determines operation of electric power converter 422. For those circumstances when generator rotor 406 is being turned at a speed slower than synchronous speed as defined by generator stator 404, i.e., a subsynchronous speed, electric power converter 422 excites generator rotor 406 with reactive power transmitted from generator side portion 424 through AC rotor bus 436. Generator rotor 406 will then appear to be turning at a synchronous speed with respect to generator stator 404 and stator 404 will generate the desired, i.e., synchronous frequency, electric power that is transmitted to electric power grid 420 as described above.

For those circumstances when generator rotor 406 is being turned at synchronous speed, electric power converter 422 excites generator rotor 406 with real power transmitted from generator side portion 424 through AC rotor bus 436. Generator stator 404 generates electric power at the synchronous frequency that is transmitted to electric power grid 420 as described above.

For those circumstances when generator rotor 406 is being turned at a speed faster than the synchronous speed, i.e., a supersynchronous speed, electric power converter 422 excites generator rotor 406 with reactive power transmitted from generator side portion 424 through AC rotor bus 436 while at the same time extracting real power from generator rotor 406 through AC rotor bus 436 to generator side portion 424. Generator rotor 406 will then appear to be turning at a synchronous speed with respect to generator stator 404 and stator 404 will generate electric power at the synchronous frequency that is transmitted to electric power grid 420 as described above. The frequency of the power extracted from generator rotor 406 will be converted to the synchronous frequency through electric power converter 422 and the rotor-generated electric power is added to the stator-generated power.

Further, in operation, when generator rotor 406 is generating electric power for transmission to grid 420, line side portion 426 of electric power converter 422 is synchronized with the frequency on line bus 412, typically a substantially constant 60 Hertz (Hz). Alternatively, the synchronous frequency is any frequency that enables operation of electric power system 400 and protection and control system 200 as described herein, including, without limitation, 50 Hz. Therefore, switching devices 444 of line side portion 426 are switching at a switching rate that enables a synchronous frequency of 60 Hz.

During such operation in subsynchronous, synchronous, and supersynchronous modes, controller 215 uses one or more non-transitory computer-readable storage media having computer-executable instructions embodied thereon, wherein when executed by processor 115 (shown in FIG. 1), the computer-executable instructions cause processor 115 to operate switching devices 444 in line side portion 426 at a first predetermined frequency, e.g., 60 Hz, to convert DC power to AC power for transmission to electric power grid 420. As such, controller 215 regulates the inductive properties, and therefore the power losses, of inductive devices 442 and AC line bus 440 such that a predetermined value of current is transmitted from an electrical conductor, i.e., positive DC bus 432 and negative DC bus 434 of DC link 428 to grid 420 as a function of a measured voltage on DC link 428.

Moreover, in operation, electric power system 400 may experience electrical disturbances. For example, without limitation, electric power system 400 may experience an overvoltage condition on DC link 428. Such over-voltage conditions may be induced by grid fault events, e.g., low-voltage ride through (LVRT) and zero-voltage ride-through (ZVRT) transients. In conjunction with other LVRT and ZVRT features of protection and control system 200 and electric power system 400, virtual dynamic braking system 480 is selectively activated based on the value of DC voltage on DC link 428. Specifically, controller 215 uses one or more non-transitory computer-readable storage media having computer-executable instructions embodied thereon, wherein when executed by processor 115, the computer-executable instructions cause processor 115 to operate switching devices 444 in line side portion 426 with at least one second predetermined frequency that is greater than 60 Hz to convert DC power to AC power for transmission through line side portion 426 to inductive devices 442 and AC line bus 440. As such, controller 215 regulates the inductive properties, and therefore, the power losses, of inductive devices 442 and AC line bus 440 such that a predetermined value of current is transmitted from an electrical conductor, i.e., positive DC bus 432 and negative DC bus 434 of DC link 428 as a function of a measured voltage on DC link 428. Rather than transmission to grid 420, the increased frequency of electric current generated by line side portion 426 induces power dissipation through inductive devices 442 and AC line bus 440 at a predetermined rate that is a function of the frequencies of the power generated by portion 426 and the inductive properties of devices 442 and bus 440, as well as the heat generation properties of switching devices 444 and diodes 446.

Operation of virtual dynamic braking system 480 may be coupled with operation of crowbar circuit 450, virtual crowbar system 460, and DC dynamic brake 470, as well as the LVRT and ZVRT features of protection and control system 200 and electric power system 400. Such cooperative operation facilitates measuring and controlling voltage values on DC link 428, AC line bus 440, grid 420, and measuring and controlling current values transmitted through AC line bus 440.

Figure 5:
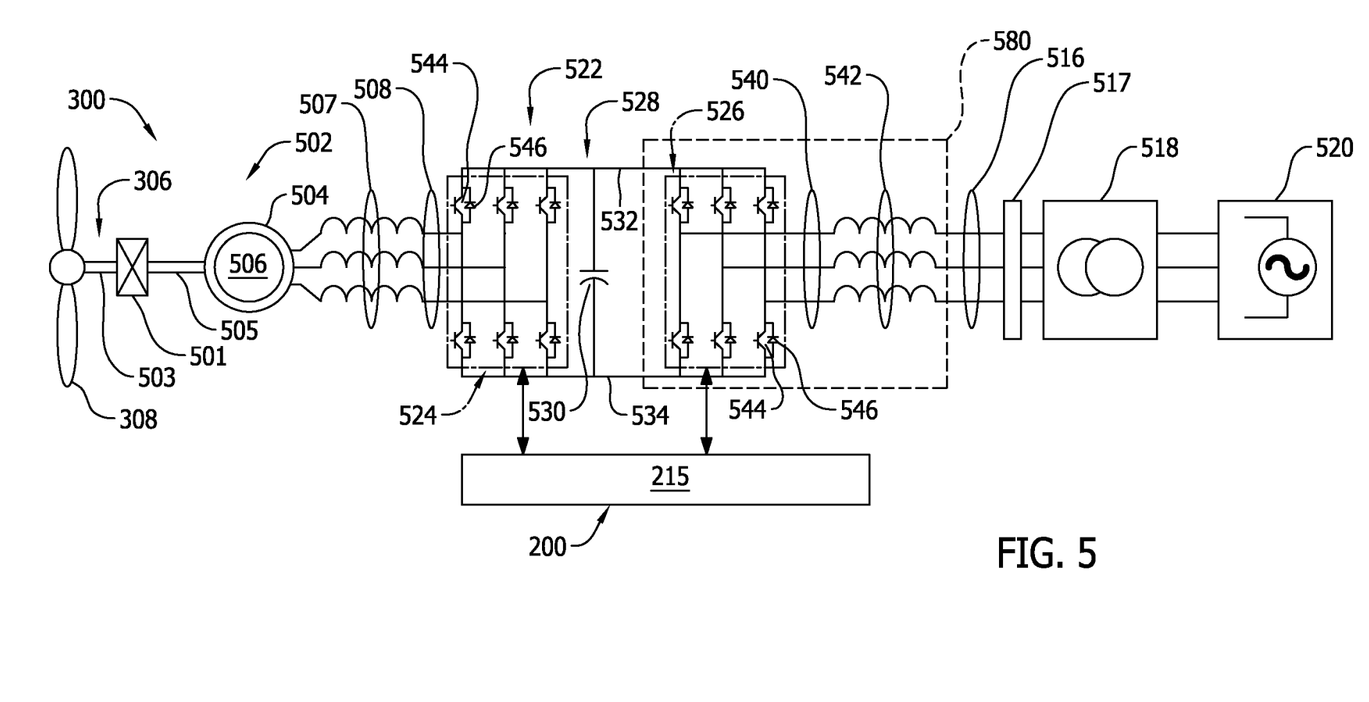
FIG. 5 is a schematic view of an exemplary alternative electric power system that may be used with the wind turbine shown in FIG. 3.

FIG. 5 is a schematic view of an exemplary alternative electric power system 500 that may be used with wind turbine 300, wherein wind turbine 300 includes a gearbox 501 rotatably coupled to a low speed shaft 503 and a high speed shaft 505. A generator 502 is rotatably coupled to high speed shaft 505. In the exemplary embodiment, generator 502 is any type of generator that enables operation of wind turbine generator 300 as described herein, including, without limitation, a synchronous permanent magnet generator (PMG) and an electrically excited synchronous generator (EESG). Gearbox 501 steps-up a rotational velocity of low speed shaft 503 to attain a rotational velocity of high speed shaft 505 that is closer to synchronous speed.

Also, in this alternative exemplary embodiment, electric power system 500 is a three-phase system. Generator 502 includes a generator stator 504 extending about a generator rotor 506 that is rotatably coupled to high speed shaft 505. Stator 504 is coupled to a stator bus 508 through a plurality of inductive devices 507. Stator bus 508 is coupled to an electric power converter 522. Electric power converter 522 includes a generator side portion 524 coupled to stator bus 508. Generator side portion 524 is coupled to a line side portion 526 through a DC link 528. DC link 528 includes at least one capacitive device 530 coupled to a positive DC bus 532 and a negative DC bus 534. Line side portion 526 is coupled to an AC line bus 540 that includes at least one inductive device 542. Stator bus 508 transmits three-phase electric power to generator side portion 524 and AC line bus 540 transmits three-phase electric power away from line side portion 526.

Each of generator side portion 524 and line side portion 526 of electric power converter 522 includes a plurality of semiconductor switching devices 544 coupled together in serial arrangement for each phase of electrical power that electric power converter 522 receives, converts, and transmits. In the exemplary embodiment, switching devices 544 are semiconductor devices, e.g., insulated gate bipolar transistors (IGBTs), that include base, emitter, and collector portions (not shown) and an inverse, or anti-parallel diode 546. Alternatively, switching devices 544 are any other suitable transistor or any other suitable switching device, including, without limitation, gate turn-off thyristors (GTOs). Alternatively, generator side portion 524 and line side portion 526 may include any suitable number of switching devices 544 arranged in any suitable configuration. A stator-synchronizing switch 517 couples AC line bus 540 to a main transformer 518 that couples electric power system 500 to an electric power grid 520 when switch 517 is closed.

Further, in this alternative exemplary embodiment, electric power system 500 includes any combination of plurality of protective devices and systems that enable operation of system 500 as described herein. Such devices may include a crowbar circuit similar to crowbar circuit 450 (shown in FIG. 4), a virtual crowbar system similar to virtual crowbar system 460 (shown in FIG. 4), and a DC dynamic brake similar to DC dynamic brake 470 (shown in FIG. 4).

Moreover, in this alternative exemplary embodiment, electric power system 500 includes electric power system protection and control system controller 215. Controller 215 is coupled to, and controls the operation of, semiconductor switching devices 544 in generator side portion 524 and line side portion 526. Therefore, controller 215 controls the operation of generator side portion 524 and line side portion 526.

Also, in this alternative exemplary embodiment, electric power system 500 includes a virtual dynamic braking system 580. Virtual dynamic braking system 580 includes line side portion 526 of electric power converter 522, inductive devices 542, and controller 215. Therefore, controller 215 controls the operation of line side portion 526 through controlling switching devices 544 therein. In the exemplary embodiment, controller 215 is a centralized controller for the entirety of electric power system protection and control system 200. Alternatively, controller 215 is a portion of a distributed control scheme, wherein, in some embodiments, controller 215 is a standalone virtual dynamic brake controller. Furthermore, virtual dynamic braking system 580 includes at least one monitoring sensor 240 (shown in FIG. 2) coupled to inductive device 542 and controller 215, wherein monitoring sensor 540 measures voltages and currents associated with inductive device 542. Moreover, virtual dynamic braking system 580 includes at least one monitoring sensor 240 coupled to an electrical conductor, i.e., DC link 528 and controller 215, wherein monitoring sensor 240 measures voltages and currents on DC link 528.

Electric power dissipation through virtual dynamic braking system 580 is substantially similar to that for virtual dynamic braking system 480 (shown in FIG. 4).

In some alternative embodiments, a combination of electric power generation devices are used in conjunction with, or in place of, wind turbine generator 300. In at least one alternative embodiment, wind turbine generator 300 is replaced with solar panels (not shown) coupled to form one or more solar arrays (not shown) to facilitate operating at a desired power output with supplemental, solar-generated power. Solar panels include, in one alternative embodiment, one or more of a photovoltaic panel, a solar thermal collector, or any other device that converts solar energy to electrical energy. In such alternative embodiments, each solar panel is a photovoltaic panel that generates a substantially direct current power as a result of solar energy striking solar panels.

Also, in such alternative embodiments, each solar array is coupled to a power converter that is similar to at least a portion of electric power converter 522 converts the DC power to AC power that is transmitted to a transformer, similar to main transformer 518, and then subsequently to grid 520. Furthermore, although generally described herein with respect to wind turbine generator 300 and a solar array facility, the methods and systems described herein are applicable to any type of electric generation system, with or without a power converter, including, for example, fuel cells, thermal power generators, geothermal generators, hydropower generators, diesel generators, gasoline generators, and/or any other device that generates power from renewable and/or non-renewable energy sources.

Exemplary embodiments of an electric power generation facility, electric power conversion apparatus, and virtual dynamic braking systems, and methods for operating the same are described above in detail. The methods, facilities, systems, and apparatus are not limited to the specific embodiments described herein, but rather, components of the facilities, systems, and apparatus, and/or steps of the methods may be utilized independently and separately from other components and/or steps described herein. For example, the power converters, virtual dynamic braking systems, and methods may also be used in combination with other power conversion apparatus and methods, and are not limited to practice with only the electric power systems as described herein. Rather, the exemplary embodiment can be implemented and utilized in connection with many other electric power conversion applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dynamic braking system for an electric power system including at least one electrical conductor, said dynamic braking system comprising:
   a switching device coupled to the electrical conductor, said switching device configured to open and close with a plurality of predetermined frequencies;
   an inductive device coupled to said switching device, wherein power losses of said inductive device are at least partially a function of the plurality of predetermined frequencies; and,
   a dynamic braking controller coupled to said switching device, said dynamic braking controller configured to open and close said switching device with at least one of the predetermined frequencies to dissipate electric power from the electrical conductor at a predetermined rate by regulating the power losses of said inductive device as a function of the predetermined frequencies.

2. The dynamic braking system in accordance with claim 1, wherein said switching device comprises an insulated gate bipolar transistor (IGBT).

3. The dynamic braking system in accordance with claim 1, wherein said switching device comprises a line side portion of an electric power converter.

4. The dynamic braking system in accordance with claim 1, wherein said dynamic braking controller comprises:
   at least one processor; and,
   at least one non-transitory computer-readable storage media coupled to said processor, said non-transitory computer-readable storage media having computer-executable instructions embodied thereon, wherein when executed by said processor, the computer-executable instructions cause said processor to operate said switching device at the predetermined frequencies, thereby regulating the power losses of said inductive device and dissipating electric power from the electrical conductor at the predetermined rate.

5. The dynamic braking system in accordance with claim 1, wherein said dynamic braking controller comprises:
   at least one processor; and,
   at least one non-transitory computer-readable storage media coupled to said processor, said non-transitory computer-readable storage media having computer-executable instructions embodied thereon, wherein when executed by said processor, the computer-executable instructions cause said processor to operate said switching device to transmit electric power through said inductive device:
      at a first predetermined frequency to convert direct current (DC) power to alternating current (AC) power for transmission to an electric power grid; and,
      a second predetermined frequency, thereby regulating the power losses of said inductive device and dissipating electric power from the electrical conductor at the predetermined rate, wherein the second frequency is greater than the first frequency.

6. The dynamic braking system in accordance with claim 1, further comprising a plurality of monitoring sensors comprising:
   at least one monitoring sensor coupled to said inductive device and said dynamic braking controller, said monitoring sensor configured to measure at least one of a voltage and a current on said inductive device; and, at least one monitoring sensor coupled to the electrical conductor and said dynamic braking controller, said monitoring sensor configured to measure at least one of a voltage and a current on the electrical conductor, wherein said dynamic braking controller comprises:
at least one processor; and,
at least one non-transitory computer-readable storage media coupled to said processor, said non-transitory computer-readable storage media having computer-executable instructions embodied thereon, wherein when executed by said processor, the computer-executable instructions cause said processor to operate said switching device at the predetermined frequencies, thereby regulating the power losses of said inductive device and transmitting a predetermined value of current from the electrical conductor as a function of a measured voltage on the electrical conductor.

7. An electric power system comprising:
a direct current (DC) bus; and,
a dynamic braking system coupled to said DC bus, said dynamic braking system comprising:
an alternating current (AC) bus having power losses that are at least partially a function of a frequency of electric power transmitted therethrough;
a switching device coupled to each of said DC bus and said AC bus, said switching device configured to open and close with a plurality of predetermined frequencies; and,
a dynamic braking controller coupled to said switching device, said dynamic braking controller configured to open and close the switching device with at least one of the predetermined frequencies to dissipate electric power from said DC bus at a predetermined rate by regulating the power losses of said AC bus as a function of the predetermined frequencies.

8. The electric power system in accordance with claim 7, wherein said switching device comprises an insulated gate bipolar transistor (IGBT).

9. The electric power system in accordance with claim 7, wherein said switching device comprises a plurality of said switching devices defining a line side portion of an electric power converter.

10. The electric power system in accordance with claim 9, further comprising a generator side portion of said electric power converter coupled to one of a rotor of a wind turbine generator and a stator of a wind turbine generator.

11. The electric power system in accordance with claim 7, wherein said dynamic braking controller comprises:
at least one processor; and,
at least one non-transitory computer-readable storage media coupled to said processor, said non-transitory computer-readable storage media having computer-executable instructions embodied thereon, wherein when executed by said processor, the computer-executable instructions cause said processor to operate said switching device at the predetermined frequencies, thereby regulating the power losses of said AC bus and dissipating electric power from said DC bus at the predetermined rate.

12. The electric power system in accordance with claim 7, wherein said dynamic braking controller comprises:
at least one processor; and,
at least one non-transitory computer-readable storage media coupled to said processor, said non-transitory computer-readable storage media having computer-executable instructions embodied thereon, wherein when executed by said processor, the computer-executable instructions cause said processor to operate said switching device to transmit electric power through said AC bus:
at a first predetermined frequency to convert DC power to AC power for transmission to an electric power grid; and,
a second predetermined frequency, thereby regulating the power losses of said AC bus and dissipating electric power from said DC bus at the predetermined rate, wherein the second frequency is greater than the first frequency.

13. The electric power system in accordance with claim 7, further comprising a plurality of monitoring sensors comprising:
at least one monitoring sensor coupled to said AC bus and said dynamic braking controller, said monitoring sensor configured to measure at least one of a voltage and a current on said AC bus; and,
at least one monitoring sensor coupled to said DC bus and said dynamic braking controller, said monitoring sensor configured to measure at least one of a voltage and a current on said DC bus, wherein said dynamic braking controller comprises:
at least one processor; and,
at least one non-transitory computer-readable storage media coupled to said processor, said non-transitory computer-readable storage media having computer-executable instructions embodied thereon, wherein when executed by said processor, the computer-executable instructions cause said processor to operate said switching device at the predetermined frequencies, thereby regulating the power losses of said AC bus and transmitting a predetermined value of current from said DC bus as a function of a measured voltage on said DC bus.

14. A method for controlling an electric power system during electrical fault conditions, the electric power system including an electric power generating device, an electric power converter coupled to the electric power generating device, the electric power converter including a switching device, the electric power converter coupled to an electric power grid through an inductive device, and a virtual dynamic braking system including a virtual dynamic braking controller, said method comprising:
operating the switching device at a first frequency;
monitoring at least one electrical condition of the electric power system; and,
operating the switching device at a second frequency that is different from the first frequency as a function of a value of the monitored electrical condition, thereby regulating power losses of the inductive device and dissipating electric power through the switching device and the inductive device at a predetermined rate.

15. The method in accordance with claim 14, wherein operating the switching device at a second frequency that is different from the first frequency comprises maintaining the electric power generating device in service.

16. The method in accordance with claim 15, wherein maintaining the electric power generating device in service comprises operating the virtual dynamic braking system in conjunction with at least one of:
operation of at least one low voltage ride through (LVRT) feature;
operation of at least one zero voltage ride through (ZVRT) feature;
operation of at least one crowbar system; and,
operation of a direct current (DC) dynamic brake.

17. The method in accordance with claim 14, wherein monitoring an electrical condition of the electric power system comprises at least one of:

measuring voltage values of a DC bus of the electric power converter;
measuring voltage values of the inductive device;
measuring voltage values of the electric power grid; and,
measuring values of current transmitted through the inductive device.

18. The method in accordance with claim 17, further comprising operating the switching device at the second frequency, thereby transmitting a predetermined value of current through the inductive device as a function of the measured voltage on the DC bus.

19. The method in accordance with claim 14, wherein operating the switching device at a first frequency comprises transmitting electric power through the inductive device at a first predetermined frequency to convert DC power to alternating current (AC) power for transmission to the electric power grid.

20. The method in accordance with claim 19, wherein operating the switching device at a second frequency that is different from the first frequency comprises increasing the frequency of electric power transmitted through the inductive device.

\* \* \* \* \*